United States Patent
Obara et al.

(10) Patent No.: US 11,958,497 B2
(45) Date of Patent: Apr. 16, 2024

(54) GUIDANCE DEVICE, GUIDANCE CONTROL DEVICE, GUIDANCE METHOD, AND PROGRAM

(71) Applicant: HONDA MOTOR CO., LTD., Tokyo (JP)

(72) Inventors: Junya Obara, Tokyo (JP); Sunao Yamaguchi, Tokyo (JP); Takuma Minemura, Tokyo (JP); Yusuke Ishida, Tokyo (JP); Kenta Maruyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/890,306

(22) Filed: Aug. 18, 2022

(65) Prior Publication Data
US 2023/0074953 A1    Mar. 9, 2023

(30) Foreign Application Priority Data

Aug. 27, 2021   (JP) .................................. 2021-139091

(51) Int. Cl.
| | |
|---|---|
| *B60W 50/14* | (2020.01) |
| *B60K 35/00* | (2006.01) |
| *H04L 12/40* | (2006.01) |
| *B60K 35/28* | (2024.01) |
| *B60K 35/29* | (2024.01) |

(52) U.S. Cl.
CPC ............ *B60W 50/14* (2013.01); *B60K 35/00* (2013.01); *H04L 12/40* (2013.01); *B60K 35/28* (2024.01); *B60K 35/29* (2024.01); *B60K 2360/161* (2024.01); *B60K 2360/195* (2024.01); *B60W 2050/146* (2013.01); *B60W 2540/043* (2020.02);
(Continued)

(58) Field of Classification Search
CPC ........... B60W 50/14; B60W 2540/043; B60W 2556/10; B60W 2050/146; B60K 35/00; B60K 2370/161; B60K 2370/195; H04L 12/40; H04L 2012/40215; H04L 2012/40273
See application file for complete search history.

(56) References Cited

U.S. PATENT DOCUMENTS

2006/0055833 A1*  3/2006  Lee ..................... B60R 11/0211
                                                  348/837
2008/0295130 A1* 11/2008  Worthen .......... H04N 21/85406
                                                  725/34
(Continued)

FOREIGN PATENT DOCUMENTS

JP       2008-261703       10/2008

*Primary Examiner* — Chico A Foxx
(74) *Attorney, Agent, or Firm* — Amin, Turocy & Watson, LLP (57) ABSTRACT

A guidance device according to the present invention is installed in a movable body, the guidance device includes: an output device including a display device; an input device that receives an operation performed by an occupant of the movable body for starting each of a plurality of driving assistance functions installed in the movable body; and a guidance control device that determines whether the movable body is in a stopping period or in a traveling period, and allows the display device to display a video for explaining any one of the plurality of driving assistance functions when the movable body is in the stopping period.

9 Claims, 8 Drawing Sheets

(52) U.S. Cl.
  CPC .................... *B60W 2556/10* (2020.02); *H04L 2012/40215* (2013.01); *H04L 2012/40273* (2013.01)

(56) References Cited

U.S. PATENT DOCUMENTS

| | | | |
|---|---|---|---|
| 2009/0144622 A1* | 6/2009 | Evans | G06F 3/04886 |
| | | | 715/706 |
| 2014/0289241 A1* | 9/2014 | Anderson | G06F 16/48 |
| | | | 707/736 |
| 2020/0258321 A1* | 8/2020 | Kunkel | G07C 5/0808 |
| 2020/0384858 A1* | 12/2020 | Prottengeier | B60W 50/14 |
| 2021/0163026 A1* | 6/2021 | Ochida | B60W 60/0015 |
| 2021/0316629 A1* | 10/2021 | de Castro Bonfim | ........ |
| | | | B60W 30/06 |
| 2022/0055482 A1* | 2/2022 | Brissman | B62D 1/046 |
| 2023/0114577 A1* | 4/2023 | Sameer | B60W 30/0956 |
| | | | 340/436 |

\* cited by examiner

STILL IMAGE 1

PRESS THE SWITCH ONLY ONCE.

VOICED GUIDANCE 1

TWO STEPS LEFT UNTIL STARTUP. FIRST, PRESS THE DISPLAYED ACC SWITCH.

⇐ OCCUPANT PRESSES THE SWITCH ONCE.

STILL IMAGE 2

PRESS DOWN THE SET/RES SWITCH AT SPEED WHICH IS DESIRED TO BE MAINTAINED.

VOICED GUIDANCE 2

WHEN YOU PERFORM NEXT OPERATION, THE FUNCTION IS ACTUATED. PRESS DOWN THE DISPLAYED SET/RES SWITCH.

⇐ OCCUPANT PRESSES DOWN THE SET/RES SWITCH.

STILL IMAGE 3

THE ACC FUNCTION IS ACTUATED.

WHEN ICON IN METER IS GREEN, THE VEHICLE TRAVELS AT CONSTANT SPEED.

FOR LANE CHANGE

VOICED GUIDANCE 3

CONGRATULATIONS! THE ACC FUNCTION IS ACTUATED. WHEN ICON IN METER IS GREEN, DRIVING ASSISTANCE IS PROVIDED.

GUIDANCE DEVICE, GUIDANCE CONTROL DEVICE, GUIDANCE METHOD, AND PROGRAM

CROSS-REFERENCE TO RELATED APPLICATION

Priority is claimed on Japanese Patent Application No. 2021-139091, filed Aug. 27, 2021, the content of which is incorporated herein by reference.

BACKGROUND OF THE INVENTION

Field of the Invention

The present invention relates to a guidance device, a guidance control device, a guidance method, and a program.

Description of Related Art

A driving assistance function for performing various kinds of driving assistance for improving safety and convenience for a person driving a vehicle has been put into practical use. A highly advanced driving assistance function may be referred to as an advanced driver-assistance systems (ADAS) function. Meanwhile, recent vehicles have become multifunctional, and it may take time for a user who has purchased and received a vehicle to understand the ADAS function installed in the vehicle or select a suitable function. As a result, the user may not be able to use the ADAS function sufficiently.

Regarding this respect, a technique for explaining functions of an in-vehicle device to a user using an in-vehicle device function explaining apparatus has been disclosed, where the in-vehicle device function explaining apparatus includes a storage that stores explanations of each of the functions of the in-vehicle device, a determiner that determines whether or not it is preferable to use the functions in the current situation, and a presenter that presents the explanations of the functions in a case where the determiner determines that it is preferable to use the functions in the current situation (see Japanese Unexamined Patent Application, First Publication No. 2008-261703).

SUMMARY OF THE INVENTION

In the technique described in Japanese Unexamined Patent Application, First Publication No. 2008-261703, guidance is mainly provided while the vehicle is moving. Therefore, the user may not be able to receive the guidance of the driving assistance function with composure.

Aspects of the present invention provide a guidance device, a guidance control device, a guidance method, and a program with which it is possible to provide guidance of a driving assistance function so that the user receives the guidance with composure.

The guidance device, the guidance control device, the guidance method, and the program according to the present invention are configured as follows.

(1) The guidance device according to one aspect of the present invention is installed in a movable body, the guidance device includes: an output device including a display device; an input device that receives an operation performed by an occupant of the movable body for starting each of a plurality of driving assistance functions installed in the movable body; and a guidance control device that determines whether the movable body is in a stopping period or in a traveling period, and allows the display device to display a video for explaining any one of the plurality of driving assistance functions when the movable body is in the stopping period.

(2) In the aspect of (1) described above, the guidance control device allows the display device to display the video including operation guidance for the input device.

(3) In the aspect of (2) described above, the video is divided into a plurality of steps, and the guidance control device skips the video to a next step in response to an operation performed on the input device by the occupant according to the operation guidance in a certain step.

(4) In the aspect of any one of (1) to (3) described above, the guidance control device refers to playback history information of the video stored in a storage, and when the movable body is in the traveling period, the guidance control device allows the output device to output, as a still image and/or a voice, guidance information for explaining a startup operation or an actuation operation of the driving assistance function for which the corresponding video that has been previously displayed.

(5) In the aspect of (4) described above, the guidance device further includes an occupant recognizer that recognizes the occupant of the movable body, wherein the playback history information is generated for each occupant who has been recognized, and the guidance control device refers to information corresponding to the recognized occupant among the playback history information.

(6) In the aspect of (2) described above, the guidance device further includes a surrounding environment detecting device configured to detect a surrounding environment of the movable body, wherein the guidance control device selects a driving assistance function of which operation is to be provided with respect to the occupant while referring to vehicle state information acquired via an in-vehicle communication line on the basis of a surrounding environment detected using the surrounding environment detecting device.

(7) In the aspect of (2) described above, the guidance control device selects a driving assistance function of which operation is to be provided with respect to the occupant while referring to vehicle state information acquired from a driving assistance device via an in-vehicle communication line.

(8) A guidance control device according to another aspect of the present invention is installed in a movable body, the guidance control device including: a determiner that determines whether the movable body is in a stopping period or in a traveling period; and a guidance controller that allows a display device installed in the movable body to display a video for explaining a startup operation of any one of a plurality of driving assistance functions with respect to an input device that is installed in the movable body and that receives an operation performed by an occupant of the movable body for starting each of the plurality of driving assistance functions, when the movable body is determined to be in the stopping period.

(9) A guidance method according to another aspect of the present invention is performed by a guidance control device of a guidance device that is installed in a movable body and that includes an output device including a display device and an input device that is installed in the movable body and that receives an operation performed by an occupant of the movable body for starting each of a plurality of driving assistance functions, the method including: determining whether the movable body is in a stopping period or in a traveling period; and allowing the display device to display a video for explaining a startup operation of any one of the plurality of driving assistance functions with respect to the input device when the movable body is in the stopping period.

(10) A program according to another aspect of the present invention causes a guidance control device of a guidance device that is installed in a movable body and that includes an output device including a display device and an input device that is installed in the movable body and that receives an operation performed by an occupant of the movable body for starting each of a plurality of driving assistance functions to execute: determining whether the movable body is in a stopping period or in a traveling period; and allowing the display device to display a video for explaining a startup operation of any one of the plurality of driving assistance functions with respect to the input device when the movable body is in the stopping period.

According to the above aspects (1) to (10), it is possible to provide guidance about the driving assistance function to the user so that the user receives the guidance with composure.

According to the above aspect (5), it is possible to suitably provide, to the user, guidance to actuate the driving assistance function after the user starts to travel the movable body, whereby the user can quickly use the driving assistance function.

According to the above aspect (6), the user can select a suitable driving assistance function according to the surrounding environment.

DETAILED DESCRIPTION OF THE INVENTION

An embodiment of a guidance device, a guidance control device, a guidance method, and a program according to the present invention will be described below with reference to the drawings. The guidance device is mounted on a movable body. The movable body in the present invention moves on a road by power, for example, and can be driven by a person. In addition, the movable body is installed with a driving assistance function. In the following description, it is assumed that the movable body is a vehicle.
[Overall Configuration]

Figure 1:
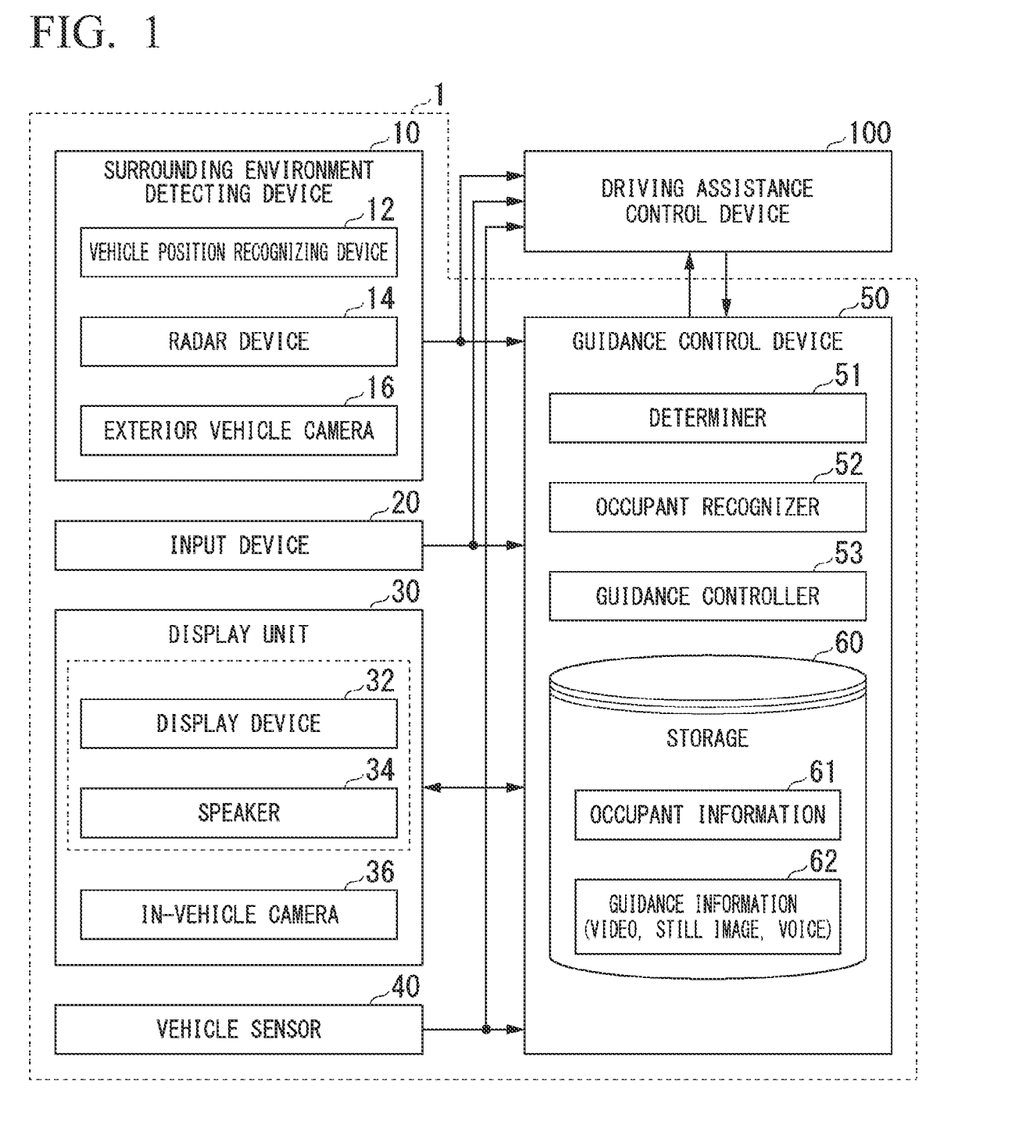
FIG. 1 is a diagram illustrating an example of configurations of devices mounted on a vehicle which mainly focus on a guidance device.

FIG. 1 is a diagram illustrating an example of configurations of devices mounted on the vehicle which mainly focus on a guidance device. The guidance device 1 provides information regarding the driving assistance function of the vehicle to a driver (or an operator) of the vehicle. The guidance device 1 includes, for example, a surrounding environment detecting device 10, an input device 20, a display unit 30, a vehicle sensor 40, and a guidance control device 50. The vehicle is further equipped with a driving assistance control device 100. These devices and instruments are connected with each other through a multiplex communication line such as a controller area network (CAN) communication line (kind of an in-vehicle communication line), a serial communication line, a wireless communication network, or the like. For example, the guidance control device 50 acquires a startup state of the driving assistance function that can be started from the driving assistance control device 100 or the like via the CAN communication line. Note that the configuration illustrated in FIG. 1 is merely an example, and a part of the configuration may be omitted, or another configuration may be added.

The surrounding environment detecting device 10 detects the surrounding environment of the vehicle. The surrounding environment detecting device 10 includes, for example, a vehicle position recognizing device 12 including a GPS receiver, map information, and the like, a radar device 14, and an exterior vehicle camera 16. The vehicle position recognizing device 12 recognizes the position of the vehicle and performs matching with the map information. The radar device 14 emits a radio wave such as a millimeter wave to the area around the vehicle, and detects a radio wave (reflected wave) reflected by an object to detect at least the position (distance and azimuth) of the object. The radar device 14 is attached to any place of the vehicle. The radar device 14 may detect the position and speed of the object by a frequency modulated continuous wave (FM-CW) method. The exterior vehicle camera 16 is, for example, a digital camera using a solid-state imaging element such as a charge coupled device (CCD) or a complementary metal oxide semiconductor (CMOS). The exterior vehicle camera 16 is attached to any place of the vehicle. When an image of an area in front of the vehicle is captured, the exterior vehicle camera 16 is attached to an upper portion of a front windshield, a rear surface of a rearview mirror, or the like. The exterior vehicle camera 16 periodically and repeatedly images the periphery of the vehicle, for example. The exterior vehicle camera 16 may be a stereo camera. The surrounding environment detecting device 10 outputs the detected result to the driving assistance control device 100 and the guidance control device 50.

The input device 20 receives an operation (including a simulated operation according to guidance of the guidance device 1) performed by an occupant of the vehicle for starting the driving assistance function. The input device 20 outputs information indicating the content of the received operation to the guidance control device 50 and the driving assistance control device 100. In the present embodiment, the input device 20 includes a vehicle switch which can acquire operation contents as a CAN signal directly or from various control devices and which includes, for example, a switch provided on a steering wheel, an instrument panel, or the like, a graphical user interface (GUI) switch set on the display unit, or the like. The input device 20 may include a driving operating element such as an accelerator pedal.

The display unit 30 includes, for example, a display device 32 that displays an image, a speaker 34 that emits voice, an in-vehicle camera 36 that captures an image of a space in the vehicle, and the like. A combination of the display device 32 and the speaker 34 is an example of an "output device". The in-vehicle camera 36 captures an image of at least the head (face) of an occupant seated on a driver seat or a passenger seat. The display device 32 may be a touch panel.

The vehicle sensor 40 includes a speed sensor that detects the speed of the vehicle, an acceleration sensor that detects acceleration, a yaw rate sensor that detects an angular velocity around a vertical axis, an orientation sensor that detects an orientation of the vehicle, and the like.

Prior to describing the guidance control device 50, the driving assistance function that can be provided by the driving assistance control device 100 will be described. The driving assistance control device 100 has, for example, the following driving assistance functions. Although FIG. 1 illustrates that one driving assistance control device 100 is provided, the driving assistance control device 100 may be provided for a single driving assistance function or for each of a plurality of driving assistance functions.

(1) Adaptive Cruise Control (ACC) function: a function of automatically accelerating and decelerating the vehicle within a preset vehicle speed and following a preceding vehicle while maintaining a inter vehicle distance from the preceding vehicle in order to reduce a driver's driving load.

(2) Cruise Control (CC) function: a function of maintaining a constant speed of the vehicle while traveling.

(3) Lane Keeping Assist System (LKAS) function: a function of assisting a steering operation so as to help keeping the vehicle at near the center of a lane during traveling on an expressway in order to reduce a driver's driving load.

(4) Collision Mitigation Braking System (CMBS) function: a function of performing assistance for collision avoidance or damage reduction with a preceding vehicle, a pedestrian, or an oncoming vehicle in a stepwise manner.

(5) Road Departure Mitigation (RDM) function: a road departure mitigation function of providing steering assistance to prevent the vehicle from departing from a lane and to return the vehicle within the lane.

(6) BSI (Blind Spot Information) function: a function of detecting another vehicle which is diagonally behind the vehicle and which is likely to be out of the driver's line of vision during traveling and alerting the driver in order to reduce a driving load.

(7) Parking sensor system (PKS) function: a function of detecting an obstacle in front of or behind the vehicle at the time of, for example, parking, exiting, or a right turn or a left turn in a narrow alley and alerting the driver in order to reduce a driving load.

(8) Low Speed Automatic Emergency Braking (LSAEB) function: this is a generic term for unintended starting restraint control and unintended backward starting restraint control, and is a function of suppressing sudden acceleration when an obstacle in front of or behind the vehicle is detected and the driver steps on the accelerator during stopping period of the vehicle or driving the vehicle at low speed.

The group of the driving assistance functions described above is merely an example, and the vehicle may be installed with any combination of the driving assistance functions or other driving assistance functions not described above.

[Guidance Control Device]

The guidance control device 50 includes, for example, a determiner 51, an occupant recognizer 52, a guidance controller 53, and a storage 60. Each of the determiner 51, the occupant recognizer 52, and the guidance controller 53 is implemented by, for example, a hardware processor such as a central processing unit (CPU) executing a program (software). Some or all of these components may be implemented by a hardware (circuit including a circuitry) such as a large scale integration (LSI), an application specific integrated circuit (ASIC), a field-programmable gate array (FPGA), or a graphics processing unit (GPU), or by software and hardware in cooperation. The program may be stored in advance in a storage device (a storage device including a non-transitory storage medium) such as a hard disk drive (HDD) or a flash memory, or may be stored in a detachable storage medium (a non-transitory storage medium) such as a DVD or a CD-ROM and installed in the storage device when the storage medium is inserted into a drive device. The guidance control device 50 performs processing while sharing information with the driving assistance control device 100 by communication, and may be included in the driving assistance control device 100.

The storage 60 may be implemented by a non-transitory storage device such as HDD, a random access memory (RAM), or a read only memory (ROM). The storage 60 stores, for example, information such as occupant information 61 and guidance information 62 (video, still image, voice).

The determiner 51 determines whether or not the vehicle is in a stopping period or in a traveling period. For example, the determiner 51 determines whether or not the vehicle is in a stopping period or in a traveling period on the basis of information collected by some or all of the speed sensor included in the vehicle sensor 40, the vehicle position recognizing device 12, and the exterior vehicle camera 16. For example, the determiner 51 determines that the vehicle is in a stopping period when the output of the speed sensor indicates zero and the position information output from the GPS receiver is unchanged or the degree of change in the image captured by the exterior vehicle camera 16 is small. Otherwise, the determiner 51 determines that the vehicle is in a traveling period.

Figure 2:
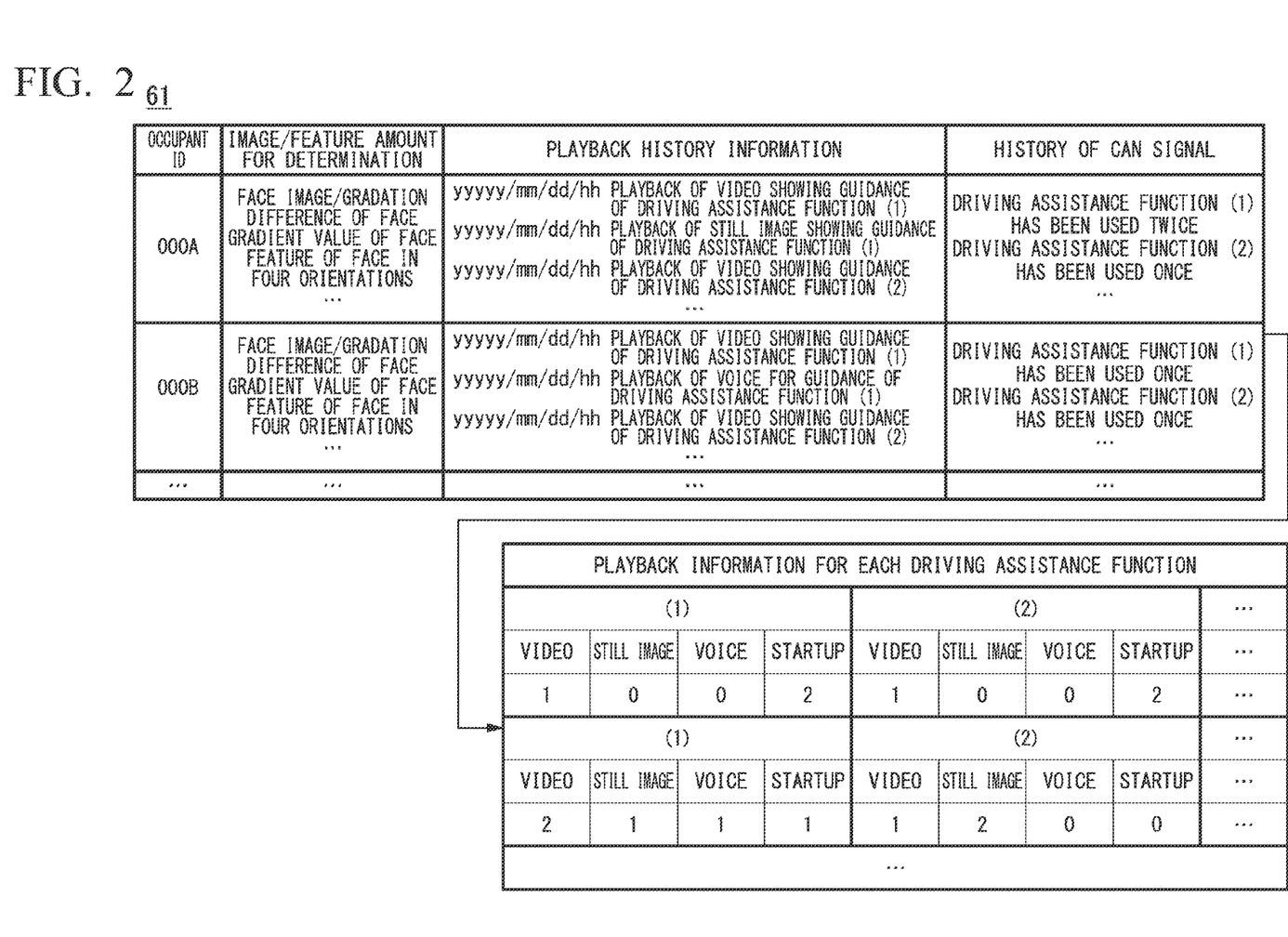
FIG. 2 is a diagram illustrating an example of the detail of occupant information.

The occupant recognizer 52 recognizes who an occupant in the vehicle is (recognizes the occupant) on the basis of an image of the occupant captured by the in-vehicle camera 36, for example. The occupant recognizer 52 recognizes the occupant on the basis of the occupant information 61 stored in the storage 60, for example. FIG. 2 illustrates an example of the detail of the occupant information 61. The occupant information 61 is information in which, for example, an image captured in advance or a feature amount of the image for determination, and playback history information of a video and a still image/voice are associated with an occupant ID which is identification information of an occupant. The playback history information will be described later.

The occupant recognizer 52 compares the image of the occupant captured by the in-vehicle camera 36 (or the feature amount derived from the image) with the image for determination (or the feature amount of the image for determination). When the similarity between the captured image and the image for determination exceeds a certain level, the occupant recognizer 52 recognizes that the occupant in the image captured by the in-vehicle camera 36 is the occupant having the occupant ID registered in the occupant information 61. In a case where the image of the occupant captured by the in-vehicle camera 36 (or the feature amount derived from the image) and the image for determination (or the feature amount of the image for determination) do not match, the occupant recognizer 52 recognizes that the occupant has not been imaged in advance, and adds, as a new occupant, the image (or the feature amount derived from the image) of the imaged occupant to the occupant information 61 as a image for determination (or the feature amount of the image for determination) for next time in association with a newly issued occupant ID. As a method of registering a new occupant, occupant information which has been registered can be referred to on the display unit 30.

The "playback history information" of the occupant information 61 stores, for each of occupant IDs, when (date and time) and how (video, still image, voice) each driving assistance function is activated. The occupant information 61 may include playback information for each driving assistance function in addition to (or in place of) the playback history information. The "playback information for each driving assistance function" is obtained by aggregating, for each driving assistance function, the number of times the video, the still image, and the voice are played and the number of times the video, the still image, and the voice are started.

The "history information of CAN signal" of the occupant information 61 indicates, for example, a history of information transmitted and received between, for example, the driving assistance control device 100 and the guidance control device 50 via an in-vehicle bus such as a CAN communication line. The use history of each driving assistance function can be recognized from the "history information of CAN signal".

The guidance controller 53 controls the display device 32 and the speaker 34 of the output device 33 on the basis of, for example, the driving state of the vehicle determined by the determiner 51, the occupant information 61, and the guidance information 62. The guidance information 62 includes information regarding the video, still image, voice, or the like for each driving assistance function.

In the present embodiment, the driving assistance functions that can be provided by the driving assistance control device 100 are classified into, for example, a comfort assistance function and a safety assistance function. The guidance device 1 provides guidance regarding the comfort assistance function while the vehicle is in a stopping period and in a traveling period. The guidance device 1 provides guidance regarding the safety assistance function only when the vehicle is in a stopping period. The comfort assistance function indicates a function of assisting driving during traveling, and needs to be operated during traveling. Further, the occupant can turn on/off the comfort assistance function at any timing. The safety assistance function indicates a function that is automatically actuated when the vehicle is in a dangerous situation, and does not need to be operated during traveling. Furthermore, in consideration of safety and security, the safety assistance function is set to ON as standard at the time of shipment.

[Introductory Description]

A guidance method for providing guidance of the driving assistance functions by the guidance device 1 will now be described. First, as the introductory description, the guidance device 1 provides, for example, the following information according to an information notification status.

Figure 3:
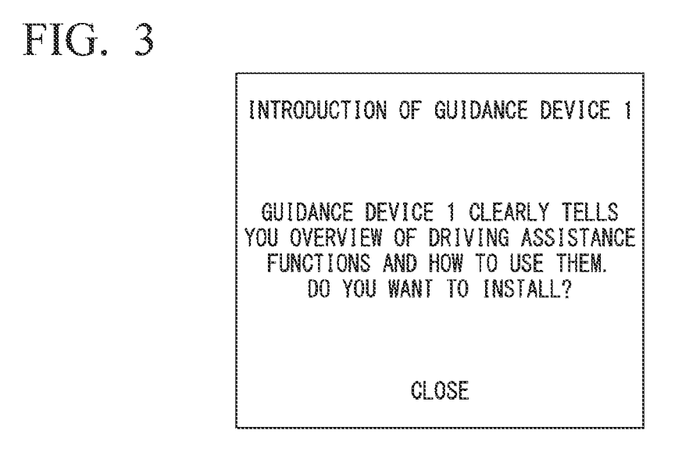
FIG. 3 is a diagram illustrating an example of displaying an introductory screen of the guidance device on a display device.

(A) When the current day is within a first period after purchase of the vehicle, the guidance device 1 allows the display device 32 to display an introductory screen as illustrated in FIG. 3 upon startup of a vehicle system. When a predetermined operation is performed on the input device 20 while this screen is displayed, the guidance device 1 starts to operate.

Figure 4:
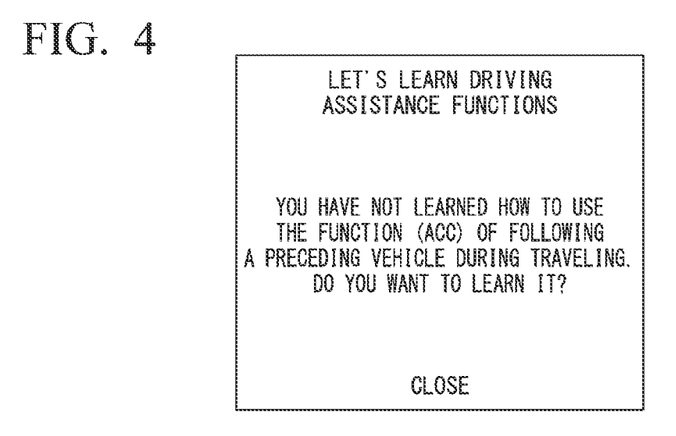
FIG. 4 is a diagram illustrating an example of displaying an introductory screen of the guidance device on the display device.

(B) When the current day is within a second period after purchase of the vehicle, the guidance device 1 allows the display device 32 to display an introductory screen as illustrated in FIG. 4 upon startup of the vehicle system. When a predetermined operation is performed on the input device 20 while this screen is displayed, a video showing a specific driving assistance function is displayed on the display device 32.

Figure 5:
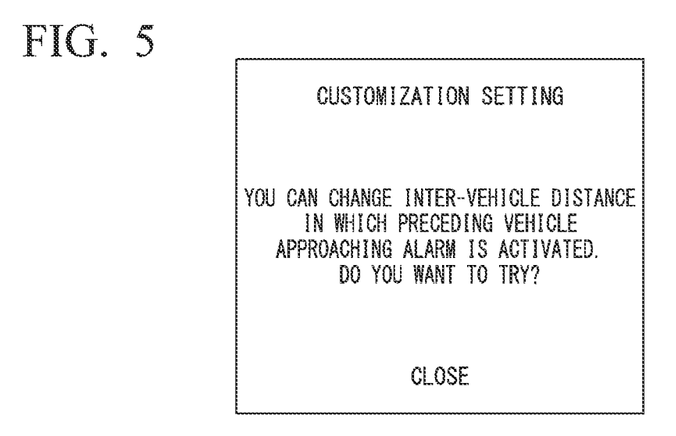
FIG. 5 is a diagram illustrating an example of displaying, on the display device, a screen prompting customization setting of the guidance device.

(C) In a state where a certain driving assistance function (here, a preceding vehicle approaching alarm) has been used, the guidance device 1 allows the display device 32 to display a screen prompting customization setting for the driving assistance function as illustrated in FIG. 5.

[Guidance of Comfort Assistance Function]

Figure 6:
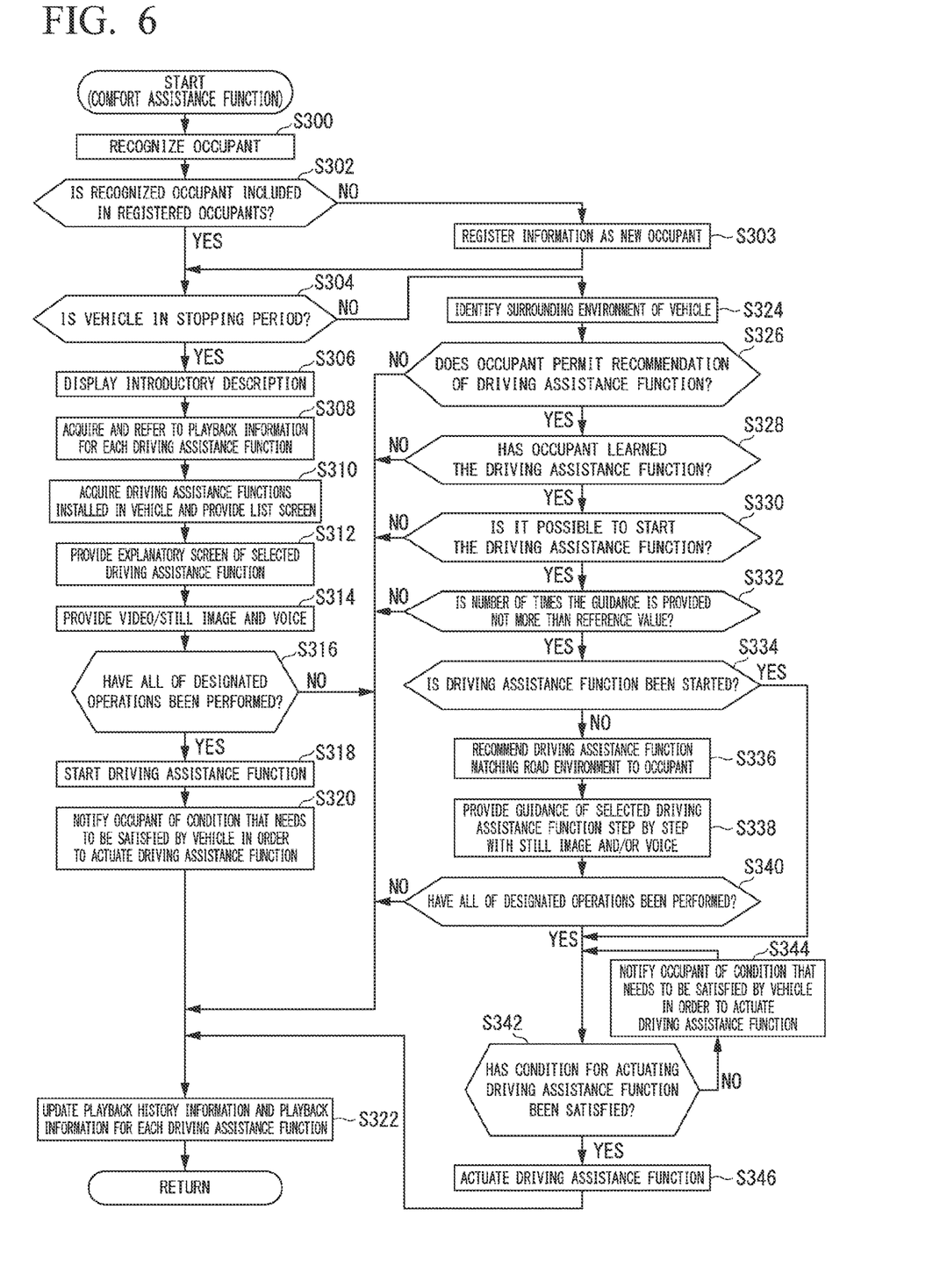
FIG. 6 is a flowchart illustrating an example of details of processing regarding a comfort assistance function executed by a guidance control device and a driving assistance control device.

FIG. 6 is a flowchart illustrating an example of details of processing regarding the comfort assistance function executed by the guidance control device 50 and the driving assistance control device 100. The processing of this flowchart is started when, for example, the vehicle system is activated, and is repeatedly executed for each control cycle.

First, the occupant recognizer 52 recognizes an occupant in the vehicle (an occupant seated in the driver seat herein) (step S300). The occupant recognizer 52 determines whether or not the occupant in the image captured by the in-vehicle camera 36 is included in occupants registered in advance in the occupant information 61 (step S302), and when the occupant is not included in the occupants registered in advance in the occupant information 61, registers information of the occupant in the occupant information 61 as a new occupant (step S303).

Next, the determiner 51 determines whether or not the vehicle is in a stopping period and in a traveling period as described above (step S304).

When it is determined that the vehicle is in a stopping period, the guidance controller 53 allows the display device 32 to display the introductory description related to the guidance device 1 as described above (step S306).

Next, the guidance controller 53 acquires and refers to the playback information for each driving assistance function corresponding to the occupant ID of the occupant recognized in step S300 (step S308). Then, the guidance controller 53 acquires driving assistance functions installed in the vehicle, and displays a driving assistance function list screen on the display device 32 when the guidance device 1 is in a main operation state (step S310). Here, when the occupant sufficiently receives guidance regarding the driving assistance function to be provided to the occupant (for example, when the number of times the driving assistance function is provided is larger than a reference value), the subsequent processes may be skipped and the processing of the flowchart may be ended.

Figure 7:
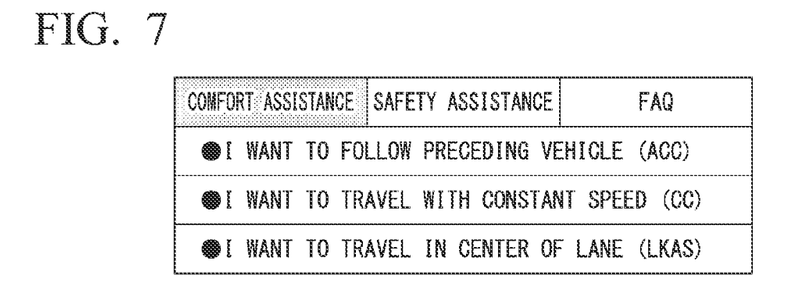
FIG. 7 is a diagram illustrating an example of a driving assistance function list screen.

FIG. 7 is a diagram illustrating an example of the driving assistance function list screen. As illustrated, the driving assistance function list screen displays the driving assistance functions which are to be shown as a video among the driving assistance functions. For example, the guidance controller 53 extracts a driving assistance function the video of which has not been played or a driving assistance function the video of which has been played less than a predetermined number of times and a still image/voice of which has not been played, on the basis of the playback information for each driving assistance function corresponding to the occupant ID of the acquired occupant, and displays a list screen that shows the extracted driving assistance functions on the display device 32. An area representing each driving assistance function on the driving assistance function list screen is displayed in the form of a GUI switch and can be selected by the occupant.

Figure 8:
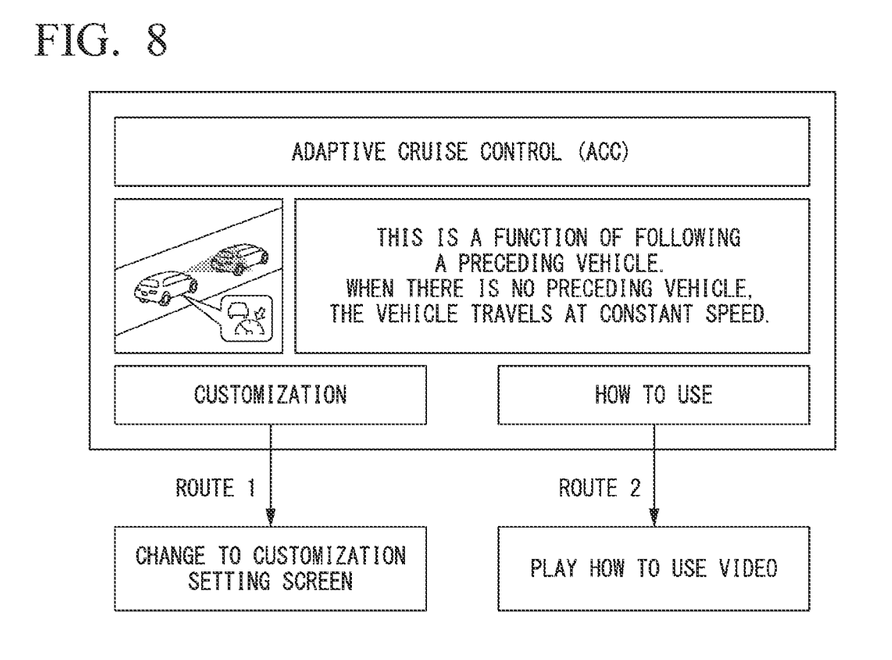
FIG. 8 is a diagram illustrating an example of an explanatory screen regarding the comfort assistance function.

When the occupant selects one of the driving assistance functions included in the driving assistance function list screen, the guidance controller 53 allows the display device 32 to display an explanatory screen related to the selected comfort assistance function (step S312). FIG. 8 is a diagram illustrating an example of the explanatory screen regarding the comfort assistance function. FIG. 8 illustrates an example of the explanatory screen regarding the ACC function in the comfort assistance function. The occupant can select one of two routes, "customization" and "how to use", in the explanatory screen, for example. When the occupant selects "customization", the guidance controller 53 changes the current display screen to a customization setting screen. When the occupant selects "how to use", the guidance controller 53 plays the how to use video of the selected comfort assistance function in a stepwise matter.

Figure 9:
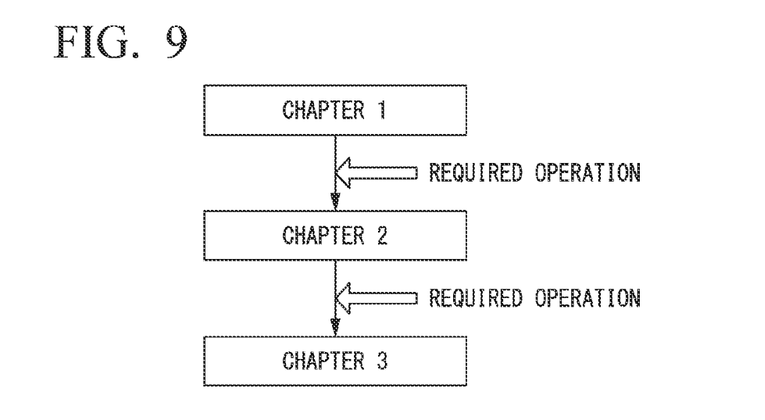
FIG. 9 is a diagram for describing an outline of a how to use video corresponding to the comfort assistance function.

The processing in the flowchart will be described below assuming that the occupant selects "how to use". In this case, the guidance controller 53 plays the how to use video of the selected comfort assistance function step by step as described above (step S314). FIG. 9 is a diagram for describing an outline of the how to use video corresponding to the comfort assistance function. The how to use video of the comfort assistance function is divided into a plurality of chapters (steps) (three chapters, chapter 1 to chapter 3 in the figure), and the occupant can skip to the next chapter by performing an operation indicated in each chapter.

Then, the guidance control device 50 determines whether or not all the operations shown in the how to use video chapter by chapter in the display device 32 have been performed (step S316). When all the operations shown in the how to use video have been performed, the driving assistance control device 100 starts the comfort assistance function involved with the operations (step S318).

The driving assistance control device 100 actuates the comfort assistance function when the comfort assistance function is started and a predetermined condition regarding the speed of the vehicle or the like is satisfied. In a case where it is determined that the vehicle is in a stopping period and the comfort assistance function is started, the driving assistance control device 100 does not actuate the comfort assistance function when determining that the speed or the like of the vehicle does not satisfy the predetermined condition. Next, the guidance control device 50 allows the display device 32 to display information notifying the occupant of a condition that needs to be satisfied by the vehicle in order to actuate the comfort assistance function (step S320).

Next, the guidance controller 53 updates the playback history information and the playback information for each driving assistance function in the occupant information 61 (S322). Thus, the processing of one cycle of this flowchart ends. Note that, in a case where the end of the guidance is indicated by some operation without performing all the operations shown in the how to use video chapter by chapter in the display device 32, the playback history information and the playback information for each driving assistance function in the occupant information 61 may be updated, or may not be updated.

On the other hand, when it is determined in step S304 that the vehicle is traveling, the guidance controller 53 identifies the surrounding environment of the vehicle using the surrounding environment detecting device 10 (step S324). Here, the guidance controller 53 identifies the type of the road on which the vehicle is present as the surrounding environment, for example. The guidance controller 53 may identify, in addition to the type of the road, a traffic volume, the number of pedestrians, weather, a time period of a day, a road line marking, a road boundary, and the like as the surrounding environment. For example, the guidance controller 53 identifies the type of the road on the basis of a result obtained by searching for map information using position information measured by the GPS receiver, the type of the road line marking in the image captured by the exterior vehicle camera 16, and the presence of a partition wall, a signboard, and the like in the image captured by the exterior vehicle camera 16.

The guidance controller 53 determines whether or not the occupant permits a recommendation of the driving assistance function to the occupant (step S326). When determining that the occupant permits the recommendation of the driving assistance function to the occupant, the guidance controller 53 determines whether or not the occupant has learned the driving assistance function (step S328). When determining that the occupant has learned the driving assistance function, the guidance controller 53 determines whether or not the driving assistance function can be started (step S330). When determining that the driving assistance function can be started, the guidance controller 53 determines whether or not the number of times the driving assistance function has been provided is not more than the reference value (step S332). When determining that the number of times the driving assistance function has been provided is not more than the reference value, the guidance controller 53 proceeds to step S334. When determining that any one of the above mentioned four determination conditions (steps S326 to S332) is not satisfied, the guidance controller 53 updates the playback history information and the playback information for each driving assistance function in the occupant information 61 (S322), and ends the processing of one cycle of this flowchart.

When determining that all the determination conditions in steps S326 to S332 are satisfied, the guidance control device 50 determines whether or not the comfort assistance function matching the surrounding environment determined in step S324 (simply referred to as the comfort assistance function hereinafter) has been started (step S334). When the comfort assistance function has been started, the guidance control device 50 and the driving assistance control device 100 determine whether or not the condition (environmental condition) for actuating the comfort driving assistance function selected in step S336 is satisfied (step S342). For example, the environmental condition required to actuate the selected comfort assistance function is that the speed of the vehicle is within a prescribed range, the road line markings on the left and right of the vehicle are recognized, the vehicle is traveling near the center between the road line markings, the curvature of the road is less than or equal to a reference value, and the turn signal is not operated.

When the condition for actuating the comfort driving assistance function is satisfied, the driving assistance control device 100 actuates the comfort assistance function (step S346). When the condition for actuating the comfort driving assistance function is not satisfied, the guidance control device 50 allows the display device 32 to display information notifying the occupant of a condition that needs to be satisfied for actuating the comfort assistance function (step S344), and performs the determination of step S342 again.

When determining in step S334 that the comfort assistance function has not been started, the guidance control device 50 selects one or more comfort assistance functions on the basis of the identified road environment, and allows the display device 32 to display information for recommending the selected comfort assistance function to the occupant (step S336). For example, the guidance controller 53 allows the display device 32 to display an image for displaying the recommended comfort assistance function in the form of a GUI switch so that the occupant can select the image.

Figure 10:
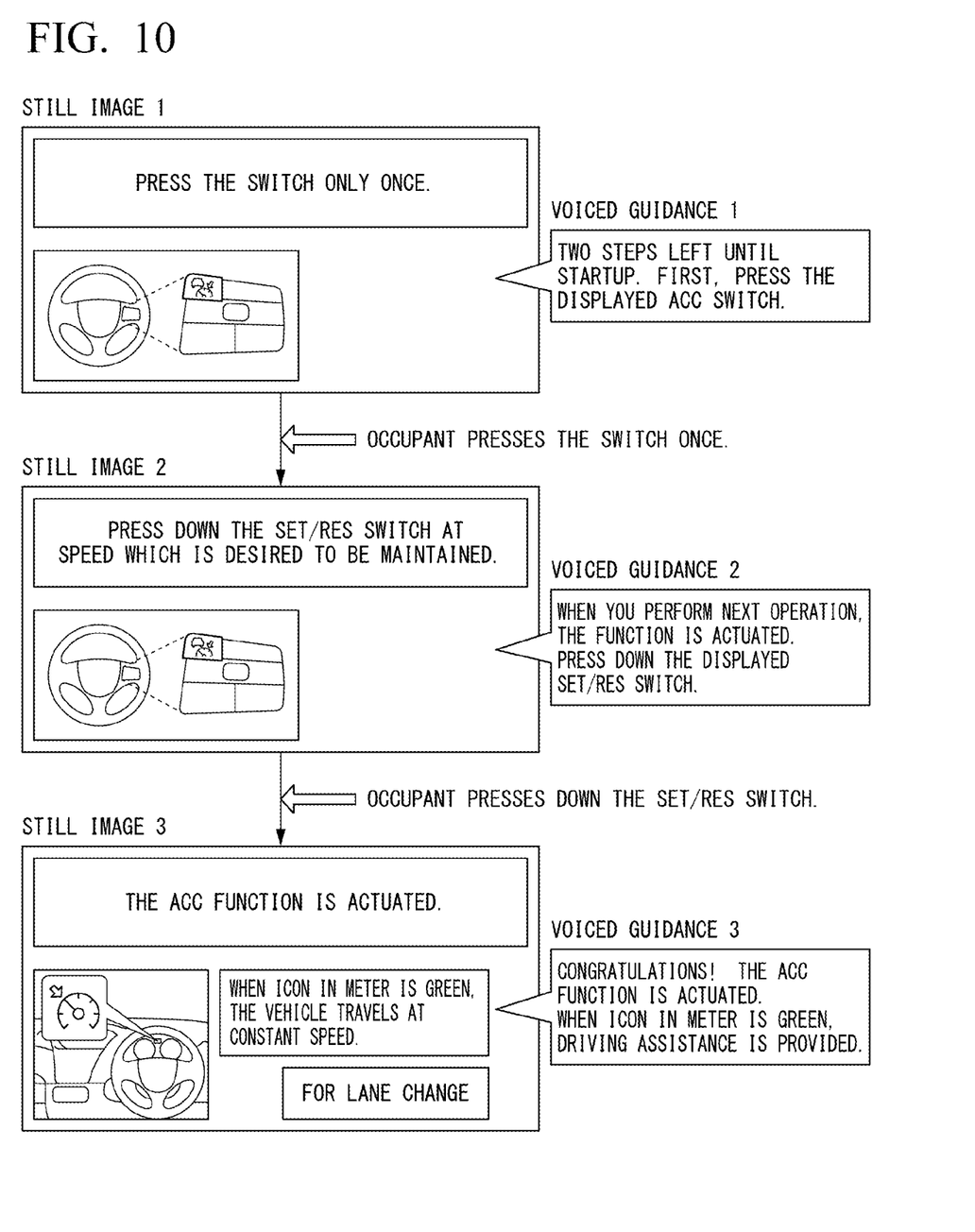
FIG. 10 is a diagram illustrating an example of an operation of an "output device" in a case where an ACC function has been recommended and an occupant has selected such ACC function.

When the occupant selects the comfort assistance function displayed on the display device 32, the guidance controller 53 allows the "output device" to output the guidance still image and/or the voiced guidance in a stepwise manner (step S338). For example, when it is determined that the vehicle is traveling on an expressway, the guidance controller 53 recommends the ACC function. FIG. 10 is a diagram illustrating an example of the operation of the "output device" in a case where the ACC function is recommended as an example and the occupant selects such ACC function.

As illustrated in FIG. 10, the guidance controller 53 allows the display device 32 to display a still image that shows an operation to be performed on the input device 20 by the occupant, and allows the speaker 34 to output voiced guidance corresponding to the still image. For example, in still image 1, the guidance controller 53 allows the display device 32 to display the still image 1 showing the operation guidance of "Press the switch only once" and allows the speaker 34 to output voiced guidance 1 of "Press the switch only once". Then, when the occupant operates a predetermined portion of a switch (steering switch hereinbelow) provided on the steering wheel according to the operation guidance provided by the still image 1 and the voiced guidance 1, the guidance controller 53 allows the display device 32 to switch the still image 1 to still image 2 showing the next step, and allows the speaker 34 to output voiced guidance 2 corresponding to the still image 2. For example, in the still image 2, the guidance controller 53 allows the display device 32 to display the still image 2 showing the operation guidance of "Press down the SET/RES switch at speed desired to be maintained" and allows the speaker 34 to output the voiced guidance 2 of "Press down the SET/RES switch at speed desired to be maintained". Then, when the occupant performs the operation corresponding to the operation guidance provided by the still image 2 and the voiced guidance 2, the guidance controller 53 allows the display device 32 to switch the still image 2 to still image 3 showing the next step, and allows the speaker 34 to output voiced guidance 3 corresponding to the still image 3, if the speed at that time meets the predetermined condition for actuating the ACC function. For example, in the still image 3, the guidance controller 53 allows the display device 32 to display a result indicating "The ACC function is actuated", and allows the speaker 34 to output voiced guidance 3 of "The ACC function is actuated". Note that an error message may be output in a case where the speed at the above time point does not meet the predetermined condition for actuating the ACC function. Note that, since the operation differs in the same function depending on the type and the model year of the vehicle, an operation method suitable for the design and the operation method of the user's vehicle may be presented.

In the operation of FIG. 10, when the comfort assistance function has already been started, playback may be started from the still image 2 instead of the still image 1.

Next, the guidance control device 50 determines whether or not all the operations indicated in the guidance image step by step by the display device 32 and the speaker 34 have been performed (step S340). In a case where all the provided operations have been performed, the comfort assistance function selected in step S336 is started and the operation necessary for actuating the comfort assistance function has been performed, or the comfort assistance function selected in step S336 has already been started and the operation necessary for actuating the comfort assistance function has been performed.

Next, the guidance control device 50 and the driving assistance control device 100 determine whether or not the condition (environmental condition) for actuating the comfort assistance function selected in step S336 is satisfied (step S342). When the condition for actuating the comfort driving assistance function is satisfied, the driving assistance control device 100 actuates the comfort assistance function (step S346). When the condition for actuating the comfort driving assistance function is not satisfied, the guidance control device 50 allows the display device 32 to display information notifying the occupant of a condition that needs to be satisfied for actuating the comfort assistance function (step S344), and performs the determination of step S342 again.

Finally, the guidance controller 53 updates the playback history information and the playback information for each driving assistance function in the occupant information 61 (S322), and ends the processing of one cycle of this flowchart. Note that, in a case where the end of the guidance is indicated by some operation without performing all the operations indicated in the guidance image step by step by the display device 32 and the speaker 34, the playback history information and the playback information for each driving assistance function in the occupant information 61 may be updated, or may not be updated.

[Safety Assistance Function]

The comfort assistance function has been described above. In the following, control regarding the safety assistance function performed by the driving assistance control device 100 will be described.

Figure 11:
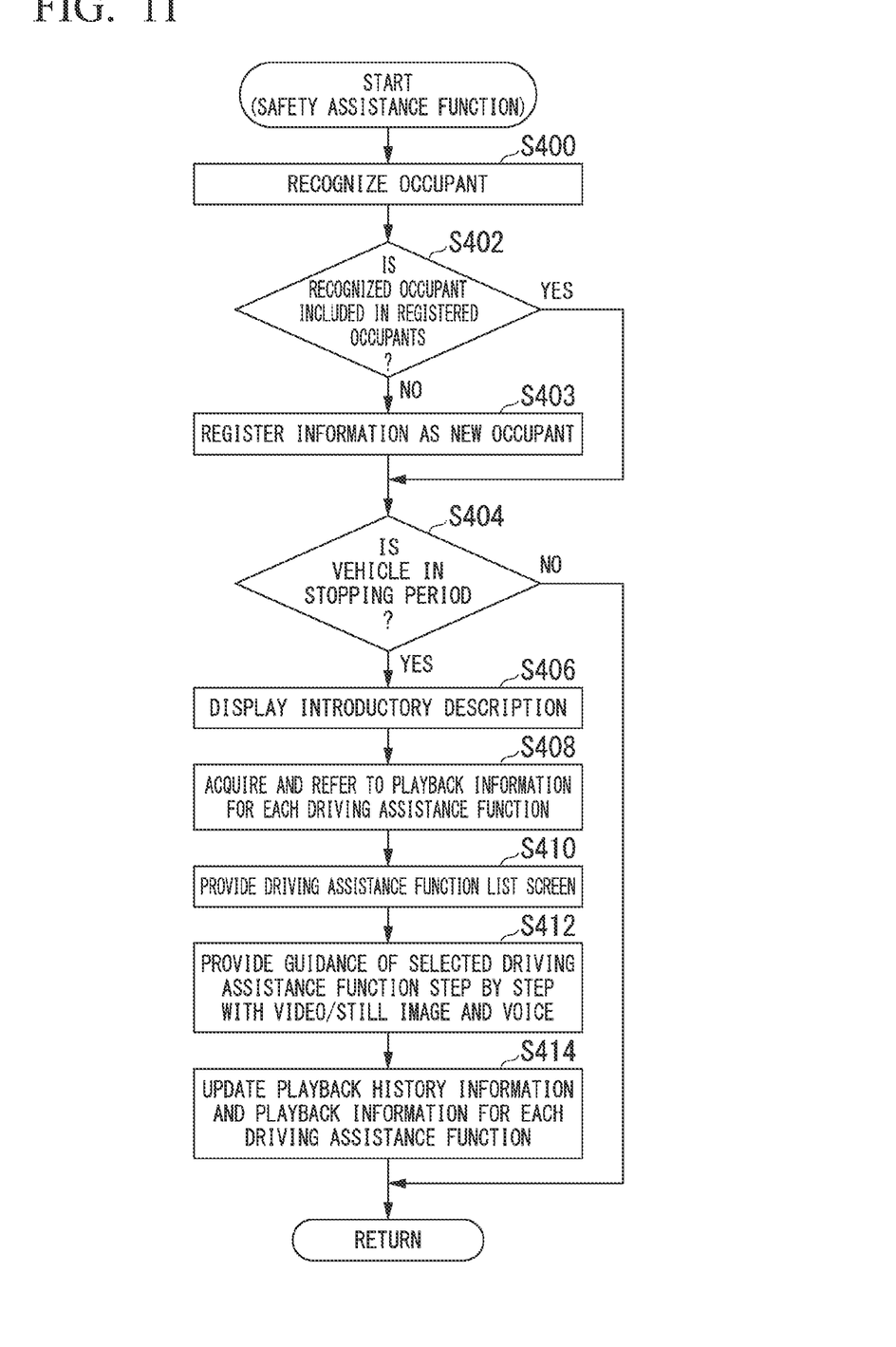
FIG. 11 is a flowchart illustrating an example of control performed by the guidance control device regarding a safety assistance function provided by the driving assistance control device.

FIG. 11 is a flowchart illustrating an example of control performed by the guidance control device 50 regarding the safety assistance function provided by the driving assistance control device 100. The processing of this flowchart is started when, for example, the vehicle system is activated, and is repeatedly executed for each control cycle, similar as in the control performed regarding the comfort assistance function.

The processes of steps S400 to S410 in this flowchart are similar to the processes of steps S300 to S310 in FIG. 6, and thus, the description thereof will be omitted. When it is determined in step S404 that the vehicle is in a traveling period, the safety assistance function is not started, and the processing of one cycle of this flowchart ends. When it is determined that the vehicle is in a stopping period, and the occupant selects one of the safety assistance functions included in the driving assistance function list screen, the guidance controller 53 allows the "output device" to output the introductory video/still image and voice related to the selected safety assistance function (step S412).

Similar to the control performed regarding the comfort assistance function described above, the guidance controller 53 plays the introductory video of the selected safety assistance function in a plurality of chapters (steps) (step S412). Next, the guidance controller 53 updates the playback history information and the playback information for each driving assistance function in the occupant information 61 (S414). Thus, the processing of one cycle of this flowchart ends. The processing of the flowcharts of FIGS. 6 and 11 may be integrated and executed as one process.

The guidance device 1 according to the embodiment described above is installed in a vehicle, and includes: an "output device" including the display device 32 and the speaker 34; and the input device 20 that receives an operation performed by the occupant for starting each of a plurality of driving assistance functions installed in the vehicle. The guidance device 1 determines whether or not the vehicle is in a stopping period and in a traveling period, and when the vehicle is in a stopping period, allows the display device 32 to display a video for explaining any one of the plurality of driving assistance functions. With this configuration, the user who has purchased and received the vehicle can receive guidance of the driving assistance function installed in the vehicle with composure.

In addition, according to the embodiment, the guidance information for explaining the startup operation is output from the output device as a still image and/or a voice when the vehicle is in a traveling period, whereby it is possible to appropriately provide the guidance for actuating the driving assistance function after the vehicle starts to travel.

Furthermore, according to the embodiment, the surrounding environment detecting device for detecting the surrounding environment is further provided, whereby the user can select a suitable driving assistance function according to the surrounding environment.

Modification of Embodiment

In the above embodiment, the occupant recognizer 52 recognizes mainly an occupant (driver) seated in the driver seat, and provides guidance with reference to the occupant information 61 regarding the driver. In the modification described below, the occupant recognizer 52 recognizes an occupant in the passenger seat, and performs processing also with reference to the occupant information 61 regarding the occupant in the passenger seat. Specifically, the guidance control device 50 skips guidance when an occupant who has sufficiently received guidance of a driving assistance function to be provided to the driver or who has frequently started the driving assistance function (that means the number of times the driving assistance function is provided is greater than the reference value, or the number of times the driving assistance function is started is greater than the reference value) is seated on the passenger seat on the basis of the occupant information 61 (including information regarding the occupant in the driver seat and the occupant in the passenger seat).

Figure 12:
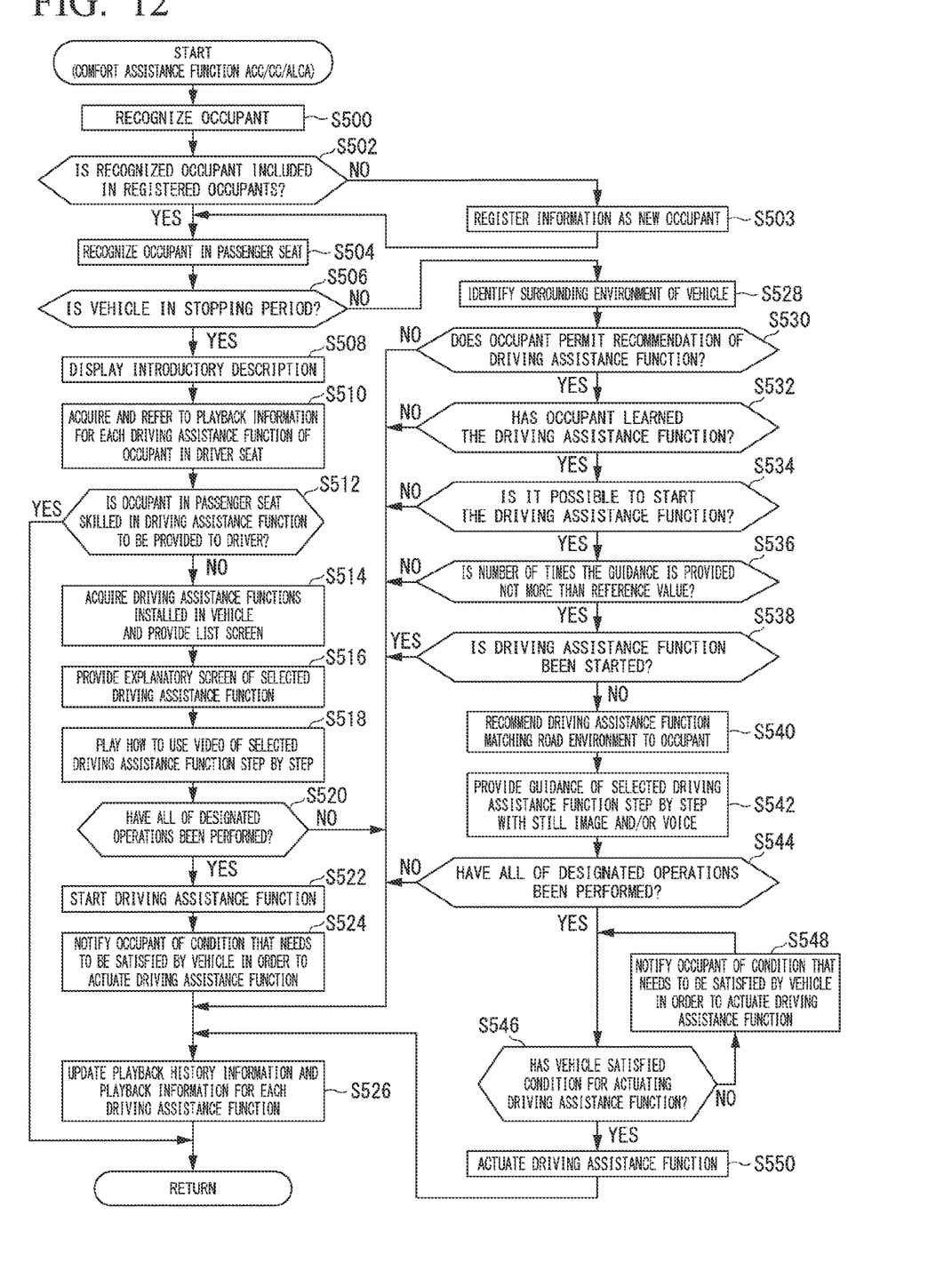
FIG. 12 is a flowchart illustrating another example of details of processing regarding the comfort assistance function executed by the guidance control device and the driving assistance control device.

FIG. 12 is a flowchart illustrating an example of the detail of processing regarding the comfort assistance function executed by the guidance control device 50 and the driving assistance control device 100, considering that the occupant in the passenger seat is further recognized and whether or not a person skilled in the driving assistance function is present in the vehicle. The processing of this flowchart is started when, for example, the vehicle system is activated, and is repeatedly executed for each control cycle.

First, the occupant recognizer 52 recognizes an occupant seated in the driver seat of the vehicle (step S500). The occupant recognizer 52 determines whether or not the occupant in the image captured by the in-vehicle camera 36 is included in occupants registered in advance in the occupant information 61 (step S502), and when the occupant is not included in the occupants registered in advance in the occupant information 61, registers information of the occupant in the occupant information 61 as a new occupant (step S503).

Next, the occupant recognizer 52 recognizes an occupant seated on a passenger seat of the vehicle (step S504). Next, the determiner 51 determines whether or not the vehicle is in a stopping period and in a traveling period as described above (step S506). When it is determined that the vehicle is in a traveling period, the processes executed by the guidance control device 50 and the driving assistance control device 100 are similar to the processes in step S324 and the subsequent steps in FIG. 6, and thus the description thereof will be omitted. When it is determined that the vehicle is in a stopping period, the guidance controller 53 allows the display device 32 to display the introductory description related to the guidance device 1 as described above (step S508).

Next, the guidance controller 53 acquires and refers to the playback information for each driving assistance function corresponding to the occupant IDs of the occupants recognized in step S500 and step S504 (step S510). The guidance controller 53 determines whether or not the occupant in the passenger seat is skilled in the driving assistance function to be provided to the driver (step S512). The occupant in the passenger seat being skilled means that the occupant in the passenger seat has reviewed the video, still image, or voice regarding the driving assistance function to be provided to the driver a certain number of times equal to or greater than the reference value or has started the driving assistance function a certain number of times equal to or greater than the reference value on the basis of the occupant information 61. In a case where the occupant in the passenger seat is skilled, the guidance controller 53 skips guidance. In a case where the occupant in the passenger seat is not skilled, the guidance controller 53 acquires the driving assistance functions installed in the vehicle and displays the list screen on the display device 32 (step S514). The processes of step S514 and the subsequent steps in this flowchart are similar to the processes of steps S310 and the subsequent steps in FIG. 6, and thus, the description thereof will be omitted.

The processing in which the occupants in the driver seat and the passenger seat are recognized and the occupant in the passenger seat is skilled regarding the comfort assistance function has been described with reference to FIG. 12. The same applies to the safety assistance function, and thus the description thereof will be omitted.

The modification of the embodiment described above provides an effect similar to the effect of the embodiment. In addition, the modification determines whether or not the occupant in the passenger seat is skilled, and when the occupant in the passenger seat is skilled, enables the user to quickly use the driving assistance function.

While the modes for carrying out the present invention have been described above using the embodiment, the present invention is not limited to the embodiment described above, and various modifications and substitutions are possible without departing from the scope of the present invention.

The above embodiment can be expressed as follows.

A guidance control device installed in a movable body and communicating with an output device including a display device, and an input device that receives an operation performed by an occupant of the movable body for starting each of a plurality of driving assistance functions installed in the movable body, the guidance control device including:
- a storage device that stores a program; and
- a hardware processor, wherein
  the hardware processor executes the program to
    determine whether the movable body is in a stopping period or in a traveling period, and
    allow the display device to display a video for explaining any one of the plurality of driving assistance functions when the movable body is in the stopping period.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A guidance device installed in a movable body, the guidance device comprising:
   an output device including a display device;
   an input device that receives an operation performed by an occupant of the movable body for starting each of a plurality of driving assistance functions installed in the movable body; and
   a guidance control device that determines whether the movable body is in a stopping period or in a traveling period, and allows the display device to display a video for explaining any one of the plurality of driving assistance functions when the movable body is in the stopping period,
   wherein the guidance control device refers to playback history information of the video stored in a storage, and when the movable body is in the traveling period, the guidance control device allows the output device to output, as a still image and/or a voice, guidance information for explaining a startup operation or an actuation operation of a driving assistance function of the plurality of driving assistance functions for which a corresponding video has been previously displayed.

2. The guidance device according to claim 1, wherein the guidance control device allows the display device to display the video including operation guidance for the input device.

3. The guidance device according to claim 2, wherein the video is divided into a plurality of steps, and
   the guidance control device skips the video to a next step in response to an operation performed on the input device by the occupant according to the operation guidance in a certain step.

4. The guidance device according to claim 1, further comprising
   an occupant recognizer that recognizes the occupant of the movable body, wherein
   the playback history information is generated for each occupant who has been recognized, and
   the guidance control device refers to information corresponding to the recognized occupant among the playback history information.

5. The guidance device according to claim 2, further comprising
   a surrounding environment detecting device configured to detect a surrounding environment of the movable body, wherein
   the guidance control device selects a driving assistance function of which operation is to be provided with respect to the occupant while referring to vehicle state information acquired via an in-vehicle communication line on the basis of a surrounding environment detected using the surrounding environment detecting device.

6. The guidance device according to claim 2, wherein the guidance control device selects a driving assistance function of which operation is to be provided with respect to the occupant while referring to vehicle state information acquired from a driving assistance device via an in-vehicle communication line.

7. A guidance control device installed in a movable body, the guidance control device comprising:
   a determiner that determines whether the movable body is in a stopping period or in a traveling period; and
   a guidance controller that allows a display device installed in the movable body to display a video for explaining a startup operation of any one of a plurality of driving assistance functions with respect to an input device that is installed in the movable body and that receives an operation performed by an occupant of the movable body for starting each of the plurality of driving assistance functions, when the movable body is determined to be in the stopping period,
   wherein the guidance controller refers to playback history information of the video stored in a storage, and when the movable body is in the traveling period, the guidance controller allows the display device comprising a speaker device to display, as a still image and/or a voice, guidance information for explaining a startup operation or an actuation operation of a driving assistance function of the plurality of driving assistance functions for which a corresponding video has been previously displayed.

8. A guidance method performed by a guidance control device of a guidance device that is installed in a movable body and that includes an output device including a display device and an input device that is installed in the movable body and that receives an operation performed by an occupant of the movable body for starting each of a plurality of driving assistance functions, the method comprising:
   determining whether the movable body is in a stopping period or in a traveling period;
   allowing the display device to display a video for explaining a startup operation of any one of the plurality of driving assistance functions with respect to the input device when the movable body is in the stopping period; and
   based on playback history information of the video stored in a storage, and when the movable body is in the traveling period, allowing the output device to output, as a still image and/or a voice, guidance information for explaining a startup operation or an actuation operation of a driving assistance function of the plurality of driving assistance functions for which a corresponding video has been previously displayed.

9. A non-transitory machine-readable medium comprising a program causing a guidance control device of a guidance device that is installed in a movable body and that includes an output device including a display device and an input device that is installed in the movable body and that receives an operation performed by an occupant of the movable body for starting each of a plurality of driving assistance functions to execute:
- determining whether the movable body is in a stopping period or in a traveling period;
- allowing the display device to display a video for explaining a startup operation of any one of the plurality of driving assistance functions with respect to the input device when the movable body is in the stopping period; and
- based on playback history information of the video stored in a storage, and when the movable body is in the traveling period, allowing the output device to output, as a still image and/or a voice, guidance information for explaining a startup operation or an actuation operation of a driving assistance function of the plurality of driving assistance functions for which a corresponding video has been previously displayed.

* * * * *